July 26, 1966  T. B. SORBIE  3,262,561

INSPECTING AND ASSORTING GLASS CONTAINERS

Filed June 15, 1964  6 Sheets-Sheet 1

INVENTOR.
THOMAS B. SORBIE
BY J. R. Nelson and
W. A. Schaich
ATTORNEYS

July 26, 1966 T. B. SORBIE 3,262,561
INSPECTING AND ASSORTING GLASS CONTAINERS
Filed June 15, 1964 6 Sheets-Sheet 3

INVENTOR.
THOMAS B. SORBIE
BY J. R. Nelson and
W. A. Schaich
ATTORNEYS

July 26, 1966 T. B. SORBIE 3,262,561
INSPECTING AND ASSORTING GLASS CONTAINERS
Filed June 15, 1964 6 Sheets-Sheet 4

INVENTOR.
THOMAS B. SORBIE
BY J. R. Nelson and
W. A. Schaich
ATTORNEYS

July 26, 1966 T. B. SORBIE 3,262,561
INSPECTING AND ASSORTING GLASS CONTAINERS
Filed June 15, 1964 6 Sheets-Sheet 5

INVENTOR.
THOMAS B. SORBIE
BY J. R. Nelson and
W. A. Schaich
ATTORNEYS

July 26, 1966 T. B. SORBIE 3,262,561
INSPECTING AND ASSORTING GLASS CONTAINERS
Filed June 15, 1964 6 Sheets-Sheet 6

INVENTOR.
THOMAS B. SORBIE
BY J. R. Nelson and
W. A. Schaich
ATTORNEYS

United States Patent Office 3,262,561
Patented July 26, 1966

3,262,561
INSPECTING AND ASSORTING GLASS CONTAINERS
Thomas B. Sorbie, Toledo, Ohio, assignor to Owen-Illinois Inc., a corporation of Ohio
Filed June 15, 1964, Ser. No. 375,103
37 Claims. (Cl. 209—75)

This invention relates to handling and inspecting glass containers and particularly to handling and inspecting the finish of glass containers for defects.

A common defect which is found in the finish of a glass container that may interfere with the sealing of the glass container or contribute to its weakness comprises checks which are mirror like cracks. The checks usually comprise vertical checks that lie in generally radial planes and horizontal planes, the latter varying substantially from the horizontal.

It is an object of this invention to provide an apparatus for inspecting glass containers simultaneously for horizontal and vertical checks in the finish of the glass containers.

It is a further object of this invention to provide an apparatus for handling and holding glass containers in position for the performance of inspection or other operations on the finish of the glass containers.

It is a further object of this invention to provide such an apparatus wherein inspections for vertical and horizontal checks may be conducted simultaneously without interference of the light beams utilized for inspection of each type of check.

It is a further object of the invention to provide such an apparatus wherein the production of false signals is minimized.

It is a further object of the invention to provide such an apparatus utilizing a novel light sensitive cell assembly.

Figure 1:
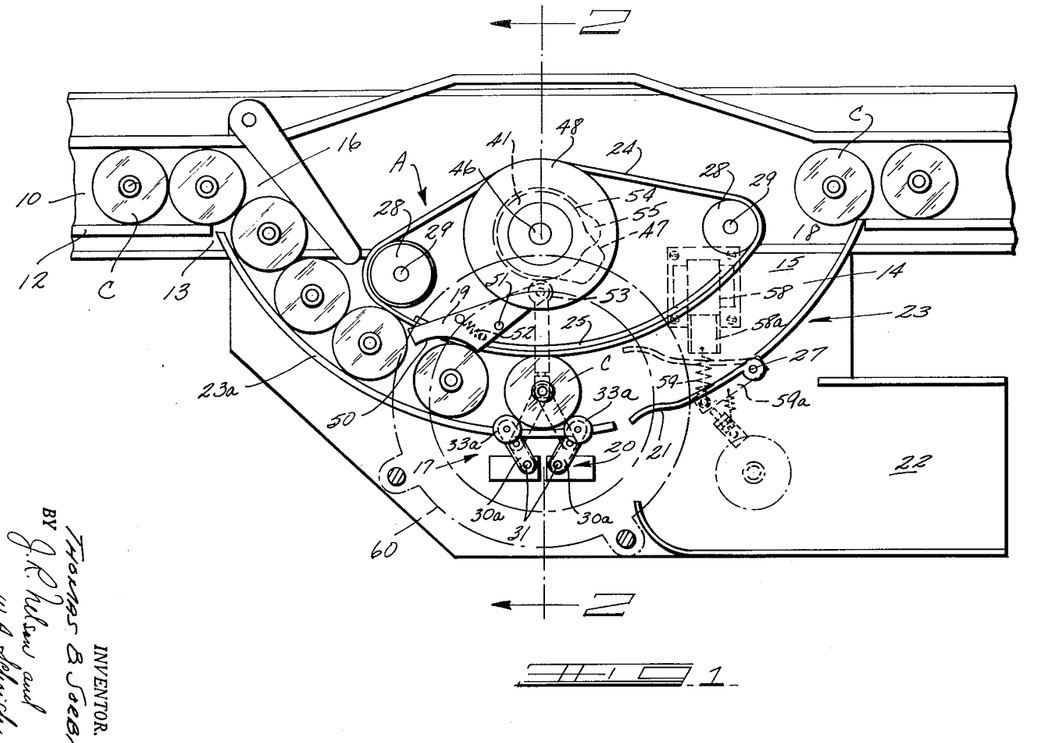
FIG. 1 is a top plan view of a container handling apparatus adapted to be used in my inspecting apparatus.

Referring to FIG. 1, the inspecting apparatus embodying the invention is adapted to be utilized in connection with a container handling apparatus such as shown in the patent to Uhlig 3,101,848 issued August 27, 1963.

The article handling apparatus A is shown attached to a conventional horizontal line conveyor 10 which may be an endless belt traveling continuously and driven by an electric motor (not shown) or the like. The articles being handled may be newly formed glass containers C which have just been annealed and require inspection, or gauging, prior to packaging for shipment to the manufacturer's customers. One side rail 12 (FIG. 1) alongside the conveyor is cut away in part to provide an opening 13 to accommodate the handling apparatus A.

This apparatus, in its illustrated embodiment, comprises a horizontal floor 14 for an arcuate path 15 along which containers C in normal upright positions move from an inlet 16 to an inspecting, or gauging station 17 and thence, if not seriously defective, to the exit end 18 where they return to the main conveyor. These containers are carried by the main conveyor 10 to a packing table, or accumulator table (not shown) where operators place them in shipping cartons. The containers C arrive at the inspecting station 17, one at a time, succeeding containers being held back out of contact with the lead container by a stop arm 19, the operation of which is timed with actuation of a hold or cradle 20 at said station. Thus each container being inspected, or gauged, may be rotated freely about its axis out of contact with any other containers. If the container being inspected, or gauged, is found to be seriously defective, mechanism to be described, is actuated to project a pivoted container discharge gate 21 across the normal path of travel of such container, preventing return of same to the main conveyor. This gate, at the proper time, returns quickly to its normal position and transfers the defective article to a receiver table 22 from which it may be removed for analysis or desired disposition.

The arcuate path 15, along which the containers travel to and beyond the inspecting or gauging station is formed by a laterally flexible fence 23, or side rail, of arcuate contour and an endless belt 24 in part trained over an arcuate guide 25. This guide 25 is arranged concentric with and on a shorter radius than the fence 23 so that the belt in effect provides an inner wall for the path 15. The fence 23 may comprise two arcuate sections 23a and 23b, each mounted upon yieldable spring brackets (not shown) and the aforementioned gate 21 which is of arcuate form and mounted upon a vertical hinge pin 27. As stated previously, this gate normally occupies the full line position of FIG. 1, so as to aid in guiding marketable merchandise back to the main conveyor 10, yet is shiftable to the dotted line position to deflect defective ware to the receiving table 22. These fence sections and the gate may be adjusted relative to the guide 25 for the belt 24 to vary the width of the path 15 to accommodate containers of different diameter. The belt 24 also functions to advance the containers along the path 15 and rotate them at the inspecting station 17.

Preferably this belt is trained over a pair of pulleys 28 (FIG. 1) which are mounted on vertical shafts 29 at the inlet and exit ends of the arcuate path 15. One of these shafts 29 (FIG. 1) has a downward extension for connection with a speed reducer and electric motor (not shown) whereby to drive the belt continuously. Thus, containers entering the path 15 are both advanced therealong and rotated continuously about their individual axes throughout their travel along said path as well as while held momentarily at the inspection staion 17 by the cradle or holder 20.

Figure 2:
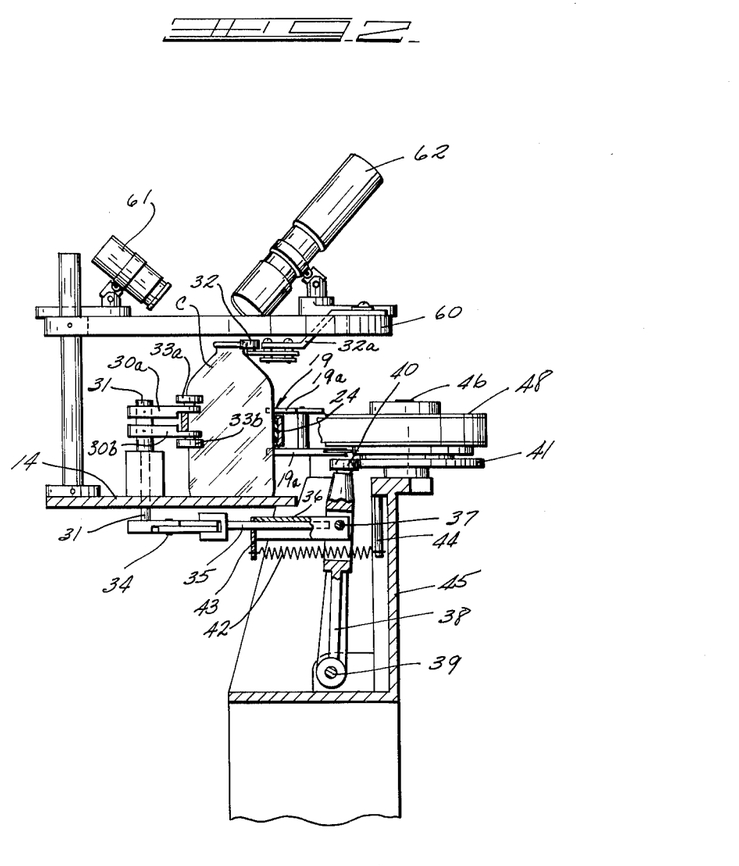
FIG. 2 is a fragmentary sectional view taken along the line 2—2 in FIG. 1.

This cradle or holder in the illustrated embodiment may comprise two pairs of pivoted horizontal arms 30a, 30b (FIGS. 1 and 2), each mounted upon a vertical pivot pin 31. At its free end each arm 30a, 30b carries roller 33a, 33b. These rollers, when the holder is restraining a container momentarily, contact the exterior sides of the latter substantially as shown in FIGS. 1 and 2. As presently described, the apparatus shown is adapted to inspect the finish of the glass containers and it is essential to hold each container firmly and rotate it about its axis. Accordingly, the apparatus includes a pair of rollers 32 mounted for rotation about fixed vertical axes on bracket 32a opposite the rollers 33a and spaced vertically above the rollers 33a and above the belt 24.

Referring to FIGS. 11–14, as a container C is moved along the platform 14 by belt 24 and approaches the inspection station, arms 30a are actuated, as presently described, to engage the sides of the container C. The diameter of the rollers 33a is slightly greater, on the order of several thousandths of an inch, than the diameter of the rollers 33b. Accordingly, as the rollers 33a engage the sides of the container C, the container C is tilted slightly to cause the finish to engage between the rollers 32. This tilts the axis of the container C slightly, shown in exaggerated fashion in FIG. 14, and thereby also tends to cause the container to be continuously urged toward the platform 14. With the rollers 33a in engagement with the container C and the finish of the container in contact with the rollers 32, the belt 24 rotates the container C about its axis. Instead of making the upper rollers 33a of greater diameter, the upper arms 30a can be made longer or can be adjusted so that they swing inwardly a greater distance to produce the same tilting action on the container.

Links 34 pivotally connect medial portions of the arms 30a, 30b and the outer end of a cam actuated horizontal push-rod 35. This push-rod 35 is slidingly mounted in the frame 36, having its inner end (FIG. 2) connected by a pivot pin 37 to a rocker-arm 38. This rocker-arm 38 is disposed generally vertically, being pivoted at its lower end to a pin 39 and at its upper end carrying a cam roll 40 which rides continuously upon the periphery of a rotary cam 41. A coil spring 42 connects a depending finger 43 on the pushrod 35 and a pin 44 carried by the base member 45 and functions to yieldingly urge the roll 40 toward the cam 41, at all times.

This cam 41 (FIGS. 1 and 2) is fixed to and rotates with a vertical shaft 46 and has a lobe 47 of proper contour and circumferential extent to move the push-rod 35 radially outward with each revolution of the cam. The spring 42 imparts reverse movement to the push-rod to thereby close the cradle arms into holding contact with a jar. Rotation of this cam is effected by securing to the upper end of the shaft 46 a grooved pulley 48 over which one reach of the container advancing and rotating belt 24 is trained. This belt rotates the cam 41 and pulley 48 thereabove in a counterclockwise direction.

It is important that each container while being held and rotated at the inspecting station be entirely out of contact with other containers, for very obvious reasons. Accordingly, I provide the stop arm or finger 19 (FIGS. 1 and 2), such being disposed horizontally and in part beneath the container contacting reach of belt 24. This arm comprises upper and lower interconnected bars 19a, each of which has an arcuate, container accommodating pocket 50, or recess at its outer end designed to cooperate with a section of the opposed fence 23 in grasping a container and holding it and all following contacting containers against advance, while a preceding container is being inspected or gauged. This arm is pivoted to a vertical pivot pin 51 and by means of a coil pull string 52 is normally urged to the full line projected position shown in FIG. 1. The inner end of this arm 19 carries a cam roll 53 which rides continuously upon a horizontal rotary cam 54, under pressure exerted by said spring 52. The cam 54 is fixed to the vertical shaft 46 which carries the holder actuating cam 41, being provided with a lobe 55 so formed and positioned circumferentially relative to the lobe 47 of the other cam that, as the holder releases a container, the stop arm likewise moves to one side and permits another single container to advance to the holder or cradle. Thus it is apparent that with rotation of the cam shaft, containers are delivered seriatim to the holder and rotated while at the inspecting station for inspection. The apparatus shown is adapted to inspect the finish of the containers and in the event a defect is detected, a gate actuating solenoid 58 is energized. This gate operating solenoid 58 secured to the underside of the floor 14 and the core extension rod 58a is connected by a coil pull-string 59 to an arm 59a which is secured to the vertical gate supporting hinge pin 27. Thus, with energization of the solenoid, the gate 21 is moved to the dotted line position of FIG. 1 where it functions to interrupt normal advance of the just inspected container along the path 15.

Figure 3:
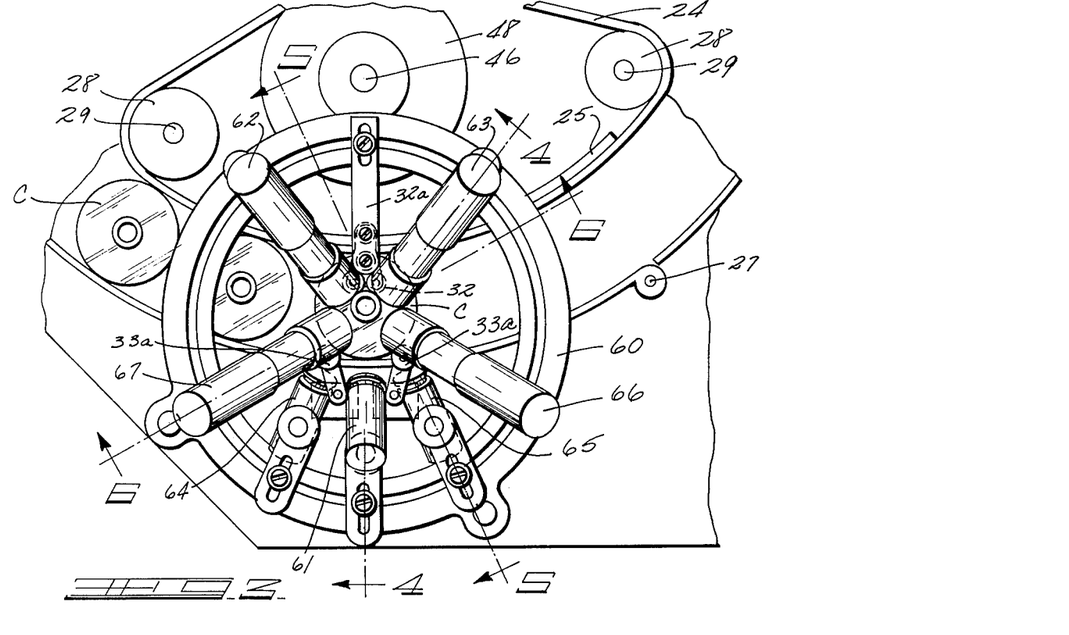
FIG. 3 is a plan view of the inspecting apparatus embodying the invention and utilized with the container handling apparatus shown in FIGS. 1 and 2.

The apparatus shown is adapted to inspect the finish of the containers and is mounted on an annular plate 60 overlying the inspection stations (FIGS. 1, 3).

Referring to FIG. 3, the horizontal check inspecting portion of the apparatus comprises a light source 61 and a pair of light sensitive cell assemblies 62, 63. The vertical check portion of the apparatus comprises a pair of light sources 64, 65 and a pair of light sensitive cell assemblies 66, 67. The light sources and the light cell assemblies are mounted on the mounting ring 60. Light sources 61, 64, 65 include incandescent lamps which provide a source for beams of radiant energy to which the container being inspected is transparent.

Figure 4:
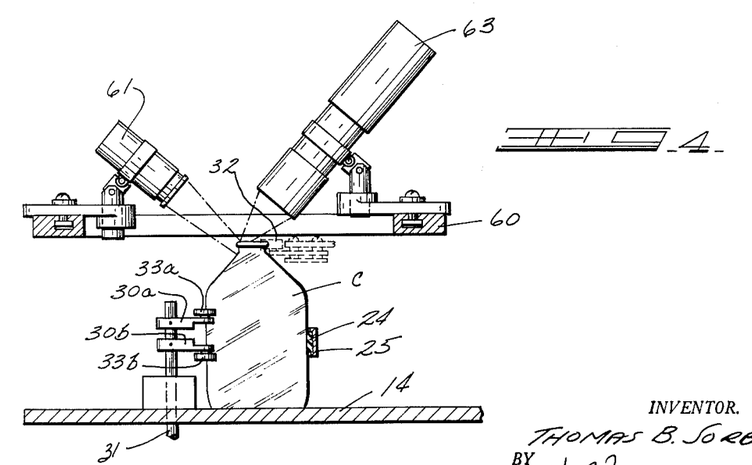
FIG. 4 is a sectional view taken along the line 4—4 in FIG. 3.

As shown in FIG. 4, the light source for inspecting for horizontal checks directs and focuses a beam of light in an image of the bulb filament which forms a rectangular spot which has its greater dimension extending vertically in the finish F of the container C. The angle between the beam and the horizontal plane of plate 60 is acute and preferably on the order of 50 degrees.

As shown in FIGS. 3 and 4, the light sensitive cell assemblies 62, 63 utilized with the light source 61 for checking for horizontal checks are mounted on each side of the radial plane in which the beam from the light source 61 lies. The line of vision of each of the light cell assemblies 62, 63 is directed at and intersects the beam at the finish of the container and forms an acute angle with the horizontal plane of mounting plate 60, preferably on the order of about 50 degrees.

When the container C is rotated at the inspecting station, a horizontal check, which is a mirror-like crack lying in a substantially horizontal plane, will reflect a portion of the light beam from light source 61 into one of the light sensitive cell assemblies 62, 63. This will create an electric signal which is amplified and caused to operate the gate 21.

Figure 5:
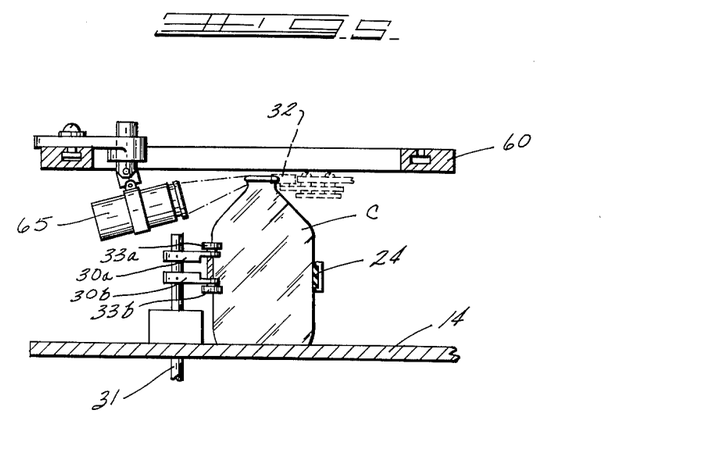
FIG. 5 is a sectional view taken along the line 5—5 in FIG. 3.
Figure 6:
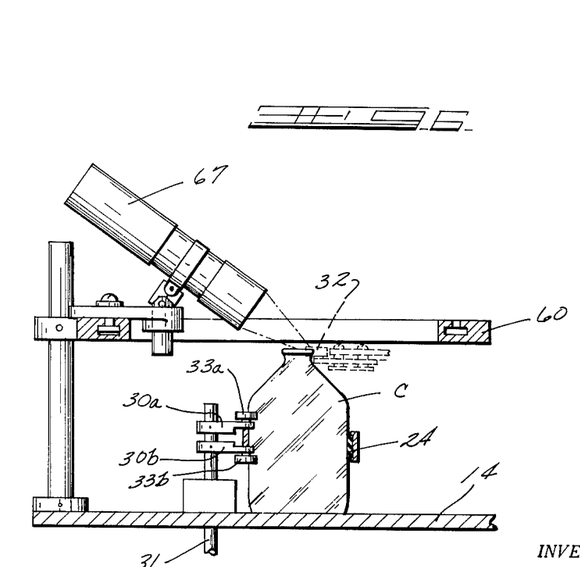
FIG. 6 is a sectional view taken along the line 6—6 in FIG. 3.

Referring to FIGS. 3 and 5, each of the light sources 64, 65 for vertical checks is mounted below the plate 61 and directs and focuses a beam of light in the form of a rectangular spot having its greater dimension extending horizontally in the finish F of the container C. The beams from the sources 64, 65 form an acute angle with the horizontal plane of the mounting plate 60 preferably on the order of about 15 degrees. As shown in FIG. 3, the beams from the light sources 64, 65 are directed at circumferentially spaced points on the finish of the container.

Light sensitive cell assembly 66 is associated with light source 64 and light sensitive cell assembly 67 is associated with light source 65. Each light sensitive assembly 66, 67 is mounted on the mounting plate 60 with its line of vision intersecting the beam of its respective light source in the finish of the container. The line of vision of each light sensitive cell assembly 66, 67 forms approximately a right angle when measured in the horizontal plane with its respective light beam and an acute angle with the horizontal plane of the mounting plate 60, preferably on the order of about 35 degrees (FIG. 5).

When a container C is rotated at the inspecting station and a vertical check is present in the finish, the vertical check comprising a mirror like defect will reflect a portion of one of the light beams from light sources 64, 65 into the corresponding light sensitive cell 66, 67 thereby energizing the gate 21.

Figure 7:
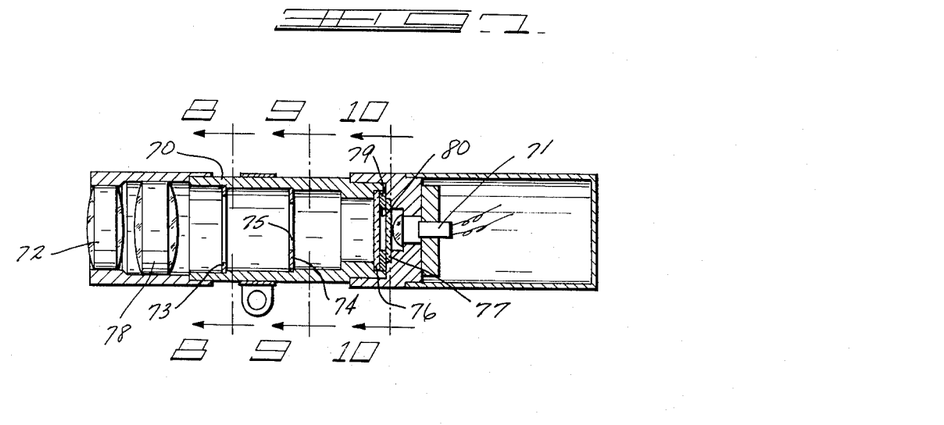
FIG. 7 is a longitudinal sectional view through a light sensitive cell assembly utilized in the apparatus shown in FIG. 2.
Figure 8:
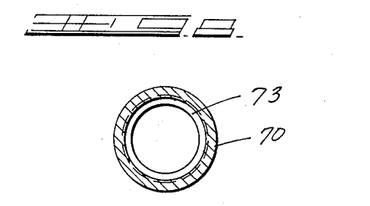
FIG. 8 is a sectional view taken along the line 8—8 in FIG. 7.
Figure 9:
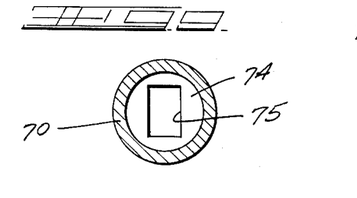
FIG. 9 is a sectional view taken along the line 9—9 in FIG. 7.
Figure 10:
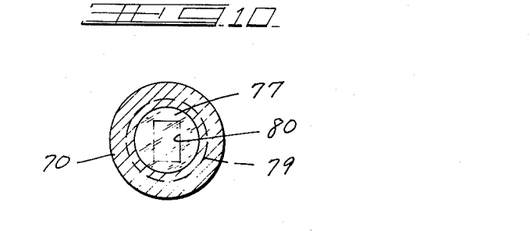
FIG. 10 is a sectional view taken along the line 10—10 in FIG. 7.
Figure 11:
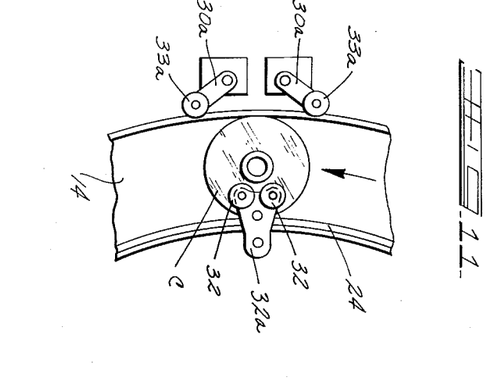
FIG. 11 is a diagrammatic plan view of the container handling and holding portion of the apparatus showing the relationship of the parts to a container as the container is moved to inspecting position.
Figure 12:
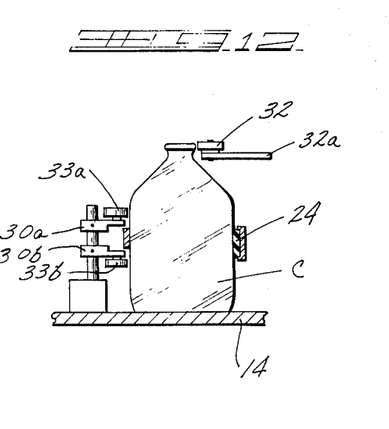
FIG. 12 is a diagrammatic elevational view of the relative position of the parts shown in FIG. 11.
Figure 13:
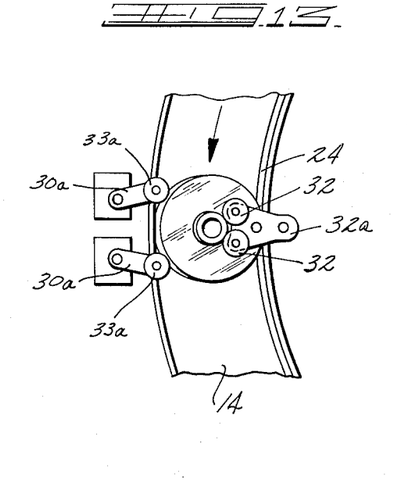
FIG. 13 is a diagrammatic plan view similar to FIG. 11 showing the parts and the container in inspecting position.
Figure 14:
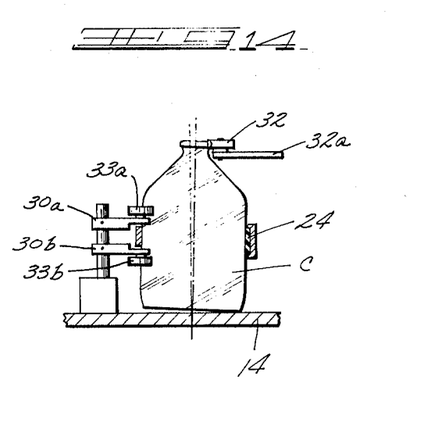
FIG. 14 is a diagrammatic elevational view of the parts as shown in FIG. 13.

Each of the light cell assemblies 62, 63, 66, 67 are substantially identical in construction such as shown in FIGS. 7-9. As shown in FIGS. 7-9, each light cell assembly comprises a cylindrical housing 70 having a light sensitive element 71 mounted therein and a lens 72 in the open end thereof which focuses the reflected image from a defect through a second lens 78 to the light sensitive element 71.

In order to minimize the possibilities of a false signal due to reflections from the surface of the container C, a mask 73 in the form of an annular opaque element is interposed between the lens 72 and the light sensitive element 71. It has been found that stray reflections from the outer surface of the container C tend to produce reflections along the inner surface of the housing 70 and the provision of the mask 73 prevents these reflections from passing to the light sensitive element 71. As a further precaution against such false signals, a second mask 74 is interposed between the first mask 73 and the light sensitive element 71. The mask 74 has a rectangular opening 75 therein of much lesser area than the open area of mask 73 thereby minimizing the chance of stray reflections from passing from the inner walls to the light sensitive element. The greater dimension of the rectangular opening 75 is oriented to vertically minimize the effect of the reflected light that otherwise would flood the inside walls of the light housing 70.

As a further precaution against stray reflections, a light polarizing element 76 is interposed between the second mask 74 and the light sensitive element 71. A filter 77 is provided in front of the light sensitive element 71. The filter 77 is made of the same material having substantially the same light transmitting characteristics as the glass of the container C being inspected. It has been found that the use of such a filter further minimizes the possibility of stray reflections passing through the light sensitive element 71. The filter 77 is mounted in a mask 79 which has an aperture 80 constructed to restrict the area of the finish viewed by the photo-sensitive cell 71. The aperture of the mask is oriented to correspond with the greater dimension of the spot of light that is focused on the finish of the container.

It can thus be seen that there has been provided an apparatus for simultaneously inspecting a container C at a single station for horizontal and vertical checks without interference of various light beams used and with a minimum of possibility for false rejection because of stray reflections.

I claim:

1. An apparatus for simultaneously inspecting the finish of a hollow glass container for horizontal and vertical checks comprising means for supporting and rotating a container about its axis,
   means for directing a beam of radiant energy to which the article is transparent against the finish of the container at an angle to the axis of the container and along a radial plane and focusing said light beam in a spot in the finish of the container,
   first light sensitive means having its line of vision intersecting the beam at the finish of the container and forming an angle with the beam in both a horizontal plane and a vertical plane,
   second light sensitive means positioned on the opposite side of the radial plane containing the light beam with its line of vision intersecting the beam at the finish of the container and forming an angle with the beam in a horizontal plane and a vertical plane,
   means for directing and focusing a second light beam in the finish of the container at a circumferentially spaced point on one side of the radial plane containing said first mentioned light beam,
   said second light beam forming an acute angle with a horizontal plane on one side of said horizontal plane,
   third light sensitive means having its line of vision intersecting said second light beam at the finish of the container and forming an angle of substantially 90 degrees with said second light beam in a horizontal plane and an acute angle with a horizontal plane,
   means for directing a third light beam and focusing it in the finish of the container at a second circumferential spaced point on the container on the other side of radial plane containing said first light beam,
   said third light beam forming an angle with the horizontal plane,
   fourth light sensitive means having its line of vision intersecting said third light beam at the finish of the container and forming an angle in the horizontal plane with said third light beam and an angle with a horizontal plane,
   and means responsive to the energization of one of said light sensitive means for rejecting the container.

2. The combination set forth in claim 1 wherein each said light sensitive means comprises a housing,
   a light sensitive element within said housing,
   lens means in one end of said housing for focusing light adjacent said light sensitive means,
   a first mask interposed between said lens means and said light sensitive element and defining an annular opaque surface,
   a second mask interposed between said first mask and said light sensitive element and defining an opening of substantially lesser cross sectional area than the opening defined by said first mask,
   a light polarizing filter interposed between said second mask and said light sensitive element.

3. The combination set forth in claim 2 including second filter means interposed between said lens means and said light sensitive element,
   said second filter means having the same transmission characteristics as the glass of which the container being inspected is made.

4. The combination set forth in claim 1 including wherein said means for supporting and rotating said container about its axis comprises
   a platform,
   an endless belt engaging the side of the container,
   and an article holding means for holding said container against said belt thereby causing rotation thereof,
   said article holding means being so constructed and arranged that the axis of the container is inclined slightly with respect to a perpendicular to the platform such that the container is maintained against the platform with its axis fixed.

5. An apparatus for simultaneously inspecting the finish of a hollow glass container for horizontal and vertical checks comprising means for supporting and rotating a container about its axis, means for directing a beam of radiant energy to which the article is transparent against the finish of the container at an angle to the axis of the container and along a radial plane and focusing said light beam in a spot in the finish of the container, first light sensitive means having its line of vision intersecting the beam at the finish of the container and forming an obtuse angle with the beam in a horizontal plane and an acute angle with the beam in a vertical plane, second light sensitive means positioned on the opposite side of the radial plane containing the light beam with its line of vision intersecting the beam at the finish of the container forming an obtuse angle with the beam in a horizontal plane and an acute angle with the beam in the vertical plane, means for directing and focusing a second light beam in the finish of the container at a circumferentially spaced point on one side of the radial plane containing said first mentioned light beam, said second light beam forming an acute angle with a horizontal plane, third light sensitive means having its line of vision intersecting said second light beam at the finish of the container and forming an angle of substantially 90 degrees with said second light beam in a horizontal plane and an acute angle with a horizontal plane, means for directing a third light beam and focusing it in the finish of the container at a second circumferential spaced point on the other side of the radial plane containing said first light beam, said third light beam forming an acute angle for the horizontal plane, fourth light sensitive means having its line of vision intersecting said third light beam at the finish of the container and forming an angle of substantially 90 degrees in the horizontal plane with said third light beam and an acute angle with horizontal plane, and means responsive to the energization of one of said light sensitive means for rejecting the container.

6. The combination set forth in claim 5 wherein each said light sensitive means comprises a housing, a light sensitive element within said housing, lens means in one end of said housing for focusing light adjacent said light sensitive means, a first mask interposed between said lens means and said light sensitive element and defining an annular opaque surface, a second mask interposed between said first mask and said light sensitive element and defining an opening of substantially lesser cross sectional area than the opening defined by said first mask, a light polarizing filter interposed between said second mask and said light sensitive element.

7. The combination set forth in claim 6 including second filter means interposed between said lens means and said light sensitive element, said second filter means having the same transmission characteristics as the glass of which the container being inspected is made.

8. The combination set forth in claim 5 wherein said means for supporting and rotating said container about its axis comprises a platform, an endless belt engaging the side of the container, an article holding means for holding said container against said belt thereby to cause rotation thereof, said article holding means being so constructed and arranged that the axis of the container is inclined slightly with respect to a perpendicular to the platform such that the container is maintained against the platform with its axis fixed.

9. An apparatus for simultaneously inspecting the finish of a hollow glass container for horizontal and vertical checks comprising means for supporting and rotating a container about its axis, means for directing a beam of radiant energy to which the article is transparent against the finish of the container at an angle to the axis of the container and along a radial plane and focusing said light beam in a rectangular spot in the finish of the container with its greatest dimension extending substantially vertically, first light sensitive means having its line of vision intersecting the beam at the finish of the container and forming an obtuse angle with the beam in both a horizontal plane and an acute angle with a vertical plane, second light sensitive means positioned on the opposite side of the radial plane containing the light beam with its line of vision intersecting the beams at the finish of the containers and forming an obtuse angle with the light beam in a horizontal plane and an acute angle with the beam in a vertical plane, means for directing a second light beam at a circumferentially spaced point on one side of the radial plane containing said first mentioned light beam and focusing it in a rectangular spot in the finish of the container with its greatest dimension extending generally horizontal, said second light beam forming an acute angle with a horizontal plane, third light sensitive means having its line of vision intersecting said second light beam at the finish of the container and forming an angle of substantially 90 degrees with said second light beam in a horizontal plane and an acute angle with a horizontal plane.

means for directing a third light beam and focusing it in the finish of the container at a second circumferentially spaced point on the other side of the radial plane containing said first light beam, said third light beam forming an acute angle for the horizontal plane, fourth light sensitive means having its line of vision intersecting said third light beam at the finish of the container and forming an angle of substantially 90 degrees in a horizontal plane with a third light beam and an acute angle with a horizontal plane, and means responsive to the energization of one of said light sensitive means for rejecting the container.

10. An apparatus for inspecting the finish of a hollow glass container for horizontal checks comprising means for supporting and rotating a container about its axis, means for directing a beam of radiant energy to which the article is transparent against the finish of the container at an angle to the axis of the container and along a radial plane and focusing said light beam in a spot in the finish of the container, first light sensitive means having its line of vision intersecting the beam at the finish of the container and forming an obtuse angle with the beam in both a horizontal plane and a vertical plane, second light sensitive means positioned on the opposite side of the radial plane containing the light beam with its line of vision intersecting the beam at the finish of the container and forming an angle with the light beam in a horizontal plane and a vertical plane, and means responsive to the energization of one of said light sensitive means for rejecting the container.

11. An apparatus for inspecting the finish of a hollow glass container for vertical checks comprising means for supporting and rotating a container about its axis, means for directing a beam of radiant energy to which the article is transparent against the finish of the container at an angle to the axis of the container and focusing said radiant energy beam in a spot in the finish of the container, first light sensitive means having its line of vision intersecting said radiant energy beam at the finish of the container and forming an angle of substantially 90 degrees with said radiant energy beam in a horizontal plane and an acute angle with a horizontal plane, means for directing a light beam and focusing it in the finish of the container at a second circumferential spaced point on the container, said light beam forming an acute angle with a horizontal plane, second light sensitive means having its line of vision intersecting said light beam at the finish of the container and forming an angle of substantially 90 degrees in a horizontal plane with said light beam and an acute angle with a horizontal plane, and means responsive to the energization of one of said light sensitive means for rejecting the container.

12. The combination set forth in claim 11 wherein each said light sensitive means comprises a housing,
 a light sensitive element within said housing,
 lens means in one end of said housing for focusing light adjacent said light sensitive means,
 a first mask interposed between said lens means and said light sensitive element and defining an opaque surface,
 a second mask interposed between said first mask and said light sensitive element and defining an opening of substantially lesser cross sectional area than the opening defined by said first mask,
 a light polarizing filter interposed between said second mask and said light sensitive element.

13. The combination set forth in claim 12 including second filter means interposed between said lens means and said light sensitive element,
 said second filter means having the same transmission characteristics as the glass of which the container being inspected is made.

14. The combination set forth in claim 11 including wherein said means for supporting and rotating said container about its axis comprises
 a platform,
 an endless belt engaging the side of the container,
 and article holding means for holding said container against said belt thereby causing rotation thereof,
 said article holding means being so constructed and arranged that the axis of the container is inclined slightly with respect to a perpendicular to the platform such that the container is maintained against the platform with its axis fixed.

15. In an apparatus for inspecting the finish of a hollow glass container for checks including means for supporting and rotating a container about its axis, means for directing a beam of radiant energy to which the article is transparent against the finish of the container and focusing said light beam in a spot in the finish of the container, light sensitive means having its line of vision forming an angle with the beam and intersecting the beam at the finish of the container, the improvement wherein each said light sensitive means comprises a housing,
 a light sensitive element within said housing,
 lens means in one end of said housing for focusing light adjacent said light sensitive means,
 a first mask interposed between said lens means and said light sensitive element and defining an annular opaque surface,
 a second mask interposed between said first mask and said light sensitive element and defining an opening of substantially lesser cross sectional area than the opening defined by said first mask,
 a light polarizing filter interposed between said second mask and said light sensitive element.

16. The combination set forth in claim 15 including second filter means interposed between said lens means and said light sensitive element,
 said second filter means having the same transmission characteristics as the glass of which the container being inspected is made.

17. In an apparatus for inspecting the finish of a hollow glass container for checks including means for supporting and rotating a container about its axis, means for directing a beam of radiant energy to which the article is transparent against the finish of the container and focusing said light beam in a spot in the finish of the container, light sensitive means having its line of vision forming an angle with the beam and intersecting the beam at the finish of the container, the improvement wherein said means for supporting and rotating said container about its axis comprises
 a platform,
 an endless belt engaging the side of the container,
 and article holding means for holding said container against said belt thereby to cause rotation thereof,
 said article holding means being so constructed and arranged that the axis of the container is inclined slightly with respect to a perpendicular to the platform such that the container is maintained against the platform with its axis fixed.

18. In an apparatus for inspecting the finish of a hollow glass container for checks including means for supporting and rotating a container about its axis, means for directing a beam of radiant energy to which the article is transparent against the finish of the container and focusing said light beam in a spot in the finish of the container, light sensitive means having its line of vision forming an angle with the beam and intersecting the beam at the finish of the container, the improvement wherein said means for supporting and rotating said container about its axis comprises
 a platform,
 first means adjacent the platform adapted to engage the finish of a container,
 second means generally diametrically opposed and spaced vertically below said first means for engaging and urging the container toward said first means,
 and container rotating means spaced vertically below said first and second means and opposite said second means against which said container is tipped by said second means for rotating the article as it is held in position by said first and second means.

19. The combination set forth in claim 18 wherein said first means comprises spaced rollers adapted to engage the finish of the container at circumferentially spaced points.

20. The combination set forth in claim 18 wherein said second means comprises at least one pair of spaced rollers adapted to engage the body of the container at a point below said first means and generally above said container rotating means.

21. In an apparatus for inspecting the finish of a hollow glass container for checks including means for supporting and rotating a container about its axis, means for directing a beam of radiant energy to which the article is transparent against the finish of the container and focusing said light beam in a spot in the finish of the container, light sensitive means having its line of vision forming an angle with the beam and intersecting the beam at the finish of the container, the improvement wherein said means for supporting and rotating said container about its axis comprises
 an arcuate horizontal floor,
 container advancing means along one margin of said horizontal floor,
 and container holding means at one point along said floor comprising first means mounted above said container advancing means adapted to engage the finish of the container, and second means generally opposed to and spaced vertically below said first means for tipping said container and holding it against said first means and said container advancing means so that the container is rotated.

22. The combination set forth in claim 21 wherein said first means comprises spaced rollers mounted in fixed position for rotation about generally vertical axes.

23. The combination set forth in claim 21 wherein said second means comprises a pair of rollers mounted for rotation about generally vertical axes and movable toward and away from said first means.

24. In an apparatus for inspecting the finish of a hollow glass container for checks including means for supporting and rotating a container about its axis, means for directing a beam of radiant energy to which the article is transparent against the finish of the container and focusing said light beam in a spot in the finish of the container, light sensitive means having its line of vision forming an angle with the beam and intersecting the beam at the finish of the container, the improvement wherein said means for supporting and rotating said container about its axis comprises an arcuate horizontal floor, container advancing means along one margin of said floor, and means adjacent and overlying said advancing means for engaging the periphery of a container and holding it in one position along said platform, and means opposed to said first mentioned means and engaging the container at a point spaced vertically below said first means for applying a force tending to tilt the container towards said first means, said last mentioned means being movable inwardly and outwardly and comprising a pair of vertically spaced container contacting portions, the uppermost portion being adapted to extend toward said first means a greater distance when said means is in position holding a container in said first means.

25. In an apparatus for inspecting the finish of a hollow glass container for checks including means for supporting and rotating a container about its axis, means for directing a beam of radiant energy to which the article is transparent against the finish of the container and focusing said light beam in a spot in the finish of the container, light sensitive means having its line of vision forming an angle with the beam and intersecting the beam at the finish of the container, the improvement wherein said means for supporting and rotating said container about its axis comprises an arcuate horizontal floor, a belt having a reach extending along one margin of said horizontal floor, guide means extending along another margin of the floor whereby a container is adapted to be advanced along said floor by an engagement with said belt and guide means, first means positioned above said belt means at one point along said floor and adapted to engage and hold the finish of the container, second means positioned along the other margin of said floor and movable toward and away from said first means, said second means being adapted to engage a container at a point vertically spaced below said first means and above said belt, whereby when said second means is moved inwardly toward said first means said container tends to be tipped to bring the finish thereof into engagement with said first means and said belt thereby holding and rotating the container in position.

26. The combination set forth in claim 25 wherein said first means comprises spaced rollers.

27. The combination set forth in claim 25 wherein said second means comprises two sets of vertically spaced rollers, the uppermost set being movable inwardly a greater distance than the innermost set.

28. An apparatus for handling containers comprising a platform, first means adjacent the platform adapted to engage the finish of a container, second means generally diametrically opposed and spaced vertically below said first means for engaging and urging the container toward said first means, and container rotating means spaced vertically below said first and second means and opposite said second means against which said container is tipped by said second means for rotating the article as it is held in position by said first and second means.

29. The combination set forth in claim 28 wherein said first means comprises spaced rollers adapted to engage the finish of the container at circumferentially spaced points.

30. The combination set forth in claim 28 wherein said second means comprises at least one pair of spaced rollers adapted to engage the body of the container at a point below said first means and generally above said container rotating means.

31. An apparatus for handling containers comprising an arcuate horizontal floor, container advancing means along one margin of said horizontal floor, and container holding means at one point along said floor comprising first means mounted above said container advancing means adapted to engage the finish of the container, and second means generally opposed to and spaced vertically below said first means for tipping said container and holding it against said first means and said container advancing means so that the container is rotated.

32. The combination set forth in claim 31 wherein said first means comprises spaced rollers mounted in fixed position for rotation about generally vertical axes.

33. The combination set forth in claim 31 wherein said second means comprises a pair of rollers mounted for rotation about generally vertical axes and movable toward and away from said first means.

34. An apparatus for handling containers comprising an arcuate horizontal floor, container advancing means along one margin of said floor, and means adjacent and overlying said advancing means for engaging the periphery of a container and holding it in one position along said platform, and means opposed to said first mentioned means and engaging the container at a point spaced vertically below said first means for applying a force tending to tilt the container towards said first means, said last mentioned means being movable inwardly and outwardly and comprising a pair of vertically spaced container contacting portions, the uppermost portion being adapted to extend toward said first means a greater distance when said means is in position holding a container in said first means.

35. An apparatus for handling containers comprising an arcuate horizontal floor, a belt having a reach extending along one margin of said horizontal floor, guide means extending along another margin of the floor whereby a container is adapted to be advanced along said floor by an engagement with said belt and guide means, first means positioned above said belt means at one point along said floor and adapted to engage and hold the finish of the container, second means positioned along the other margin of said floor and movable toward and away from said first means, said second means being adapted to engage a container at a point vertically spaced below said first means and above said belt, whereby when said second means is moved inwardly toward said first means said container tends to be tipped to bring the finish thereof into engagement with said first means and said belt thereby holding and rotating the container in position.

36. The combination set forth in claim 35 wherein said first means comprises spaced rollers.

37. The combination set forth in claim 35 wherein said second means comprises two sets of vertically spaced rollers, the uppermost set being movable inwardly a greater distance than the innermost set.

References Cited by the Examiner
UNITED STATES PATENTS

| | | | |
|---|---|---|---|
| 2,570,729 | 10/1951 | Stover | 88—14 |
| 2,873,644 | 2/1959 | Kremen et al. | 250—237 X |
| 2,902,151 | 9/1959 | Miles et al. | 209—111.7 |
| 2,947,212 | 8/1960 | Woods | 250—225 X |
| 3,027,798 | 4/1962 | Mathias | 250—220 X |
| 3,067,872 | 12/1962 | Fouse et al. | 209—111.7 X |

M. HENSON WOOD, JR., *Primary Examiner.*

A. KNOWLES, *Assistant Examiner.*